3,168,440
STABLE VITAMIN COMPOSITION
Curtis E. Meyer, Galesburg, Mich., assignor to The
Upjohn Company, Kalamazoo, Mich., a corporation
of Michigan
No Drawing. Filed June 9, 1954, Ser. No. 435,615
1 Claim. (Cl. 167—81)

This invention relates to a process for the production of a therapeutic composition of matter, and more particularly relates to a process for the production of a highly concentrated form of Intrinsic Factor and the $B_{12}$ vitamins.

Pernicious anemia was recognized as a disease as far back as 1855. However the exact nature of the disease has been baffling the medical art from that time to this. Even though the disease is not clearly understood, its treatment is understood well enough so that few lives have been lost as a result of this disease since 1926. It was not until very recently that the disease was characterized as a nutritional deficiency which could be treated with very minute amounts of vitamin $B_{12}$. Although this marked a great step forward in the treatment of the disease, it still did not supply the whole answer, since those suffering from the disease usually lack the ability to effect the transfer of the millionth of a gram of vitamin $B_{12}$ required, through the intestinal mucosa into the bloodstream. Those lacking this ability apparently do not secrete from their stomachs into their lumen a substance which is now known as Intrinsic Factor. Therefore, the successful treatment of this disease, with ordinary amounts of vitamin $B_{12}$, at least from the oral route, requires the use of both vitamin $B_{12}$ and Intrinsic Factor.

It is therefore an object of the present invention to provide a novel process for the preparation of compositions of matter useful in the treatment of pernicious anemia. Another object is to provide novel processes which increase the yield of both Intrinsic Factor from its biological sources and the $B_{12}$ vitamins from their impure sources. Another object is to provide more active compositions of matter useful in the treatment of pernicious anemia. Still another object is to provide a highly concentrated composition containing active amounts of the $B_{12}$ vitamins and Intrinsic Factor and which can be incorporated into multi-vitamin preparations. Still another object is to provide such compositions which are stable, especially when incorporated into multi-vitamin preparations. Other objects will be apparent to those skilled in the art to which this invention pertains.

The foregoing and additional objects are accomplished in the present invention by providing a novel process for the extraction of animal sources containing Intrinsic Factor, contacting a $B_{12}$ vitamin (either in a pure or impure form) therewith and separating thereform a complex containing a $B_{12}$ vitamin and Intrinsic Factor. This process not only serves to produce a highly concentrated form of Intrinsic Factor, but can be used to purify the $B_{12}$ vitamins from their impure sources.

To date considerable effort has been expended in the unsuccessful attempt to isolate and characterize Intrinsic Factor. Intrinsic Factor is found in normal human gastric juice and is derived from that source for experimental purposes; but this source is, of course, too limited for commercial use. For commercial purposes hog-stomach seems to be the best source of material since it is both potent and plentiful. The major method of determining the presence of Intrinsic Factor from any such source material is by its hematopoietic effect in pernicious anemia. This assay method has been standardized in the U.S. Pharmacopeia. However, considerable is known about other properties of Intrinsic Factor. These can be found in summarized form in Castle, New England Journal of Medicine, 249: 603–614 (October 8, 1953). It can be stated that the presence or absence of Intrinsic Factor can be accurately determined although its exact chemical structure is not known. The efficacy of Intrinsic Factor when used in combination with vitamin $B_{12}$ in the treatment of pernicious anemia having thus been established, any improvements in the process of extracting that material and in its combination with readily available vitamin $B_{12}$ becomes of great importance. Prior to the present invention Intrinsic Factor was administered in a bulky impure form. It has been a real problem to concentrate it sufficiently to incorporate it into multi-vitamin preparations. Its stability in such preparations, especially in liquid form, has also been a problem. Apparently the $B_{12}$ vitamins react with reducing agents such as vitamin C in such preparations.

The term "$B_{12}$ vitamins" is used in a generic sense in the present specification and is intended to include the various active $B_{12}$ vitamins such as $B_{12}$, $B_{12b}$, $B_{12c}$ and the like. These are sometimes called "cobalamins."

Free vitamin $B_{12}$ after exposure to light converts to $B_{12b}$. It is also believed that the $B_{12b}$ form is the more unstable vitamin in multi-vitamin preparations, especially in the presence of vitamin C or other reducing agents. Since a large proportion of the $B_{12}$ vitamins produced by certain commercially useful methods, such as from the Streptomyces organisms, is the $B_{12b}$ form, the stability of that form becomes exceedingly important. It is believed that vitamin $B_{12b}$ has never been complexed in a stable form prior to the present invention.

When the starting material for the process of the present invention consists of desiccated, defatted whole hog-stomach powder, it is extracted with five to ten volumes/weight of water at a temperature of from zero degrees to forty degrees centigrade. Room temperature is preferred since it is the most convenient, and zero degrees is the minimum temperature since that is the freezing point of water, while forty degrees is the maximum since Intrinsic Factor is heat labile beyond that point. This extract is then separated from the insoluble residue by any one of several procedures well known to the art, such as filtration and centrifuging. The pH is adjusted between about 4.3 to 6 (4.8 to 5.1 being preferred) with any acid not incompatible with Intrinsic Factor, such as hydrochloric acid. An amount of a $B_{12}$ vitamin equivalent to the capacity of the extract to combine with it as determined by microbial assay [Ternberg et al., J.A.C.S. 71, 3858 (1949)] is then added. The whole is then chilled to zero degrees centigrade, if not previously chilled, and acetone is added to give a concentration of 55 percent volume/volume. The acetone added can be at a temperature from about minus ten degrees centigrade to room temperature. Its concentration can be varied from about forty to sixty percent.

The precipitate resulting from the foregoing process is separated from the supernatant by decanting, centrifuging so that air does not contact the precipitate and freeing of entrapped aqueous acetone by lyophilizing (freeze-drying) or spray drying either with or without the addition of a small amount of water before drying. In this form the material is concentrated enough for most pharmaceutical uses (such as in multi-vitamin capsules), although it can be further purified.

Several other variations can be made in the process outlined above. For example, fresh-frozen whole hog-stomach or the mucosa alone can be used instead of the powder. It should be fresh-frozen since the slaughter of the animal is seldom near the place of manufacture and considerable time is required to collect enough material to operate the process commercially. Failure to freeze under these circumstances would result in considerable loss of activity. The mucosa should first be comminuted by any suitable means, e.g., a meat grinder. It is preferred to use up to fifteen percent acetone to extract the mucosa when fresh stomach is used, to facilitate filtration. The extraction can take from two to 24 hours depending upon how finely divided the starting material is. The two hour time is based upon vitamin $B_{12}$ combining capacity. When acetone is added at the extraction stage, the amount added later should be reduced to make up a concentration of no more than about forty to sixty percent volume/volume as noted above. Furthermore the $B_{12}$ vitamin can be admixed directly into the starting material before it is extracted.

It should be understood that any source containing Intrinsic Factor in an impure form will work with the above process and that the $B_{12}$ vitamin can be added at the first extraction stage prior to separation of the extract. In the outlined process the $B_{12}$ vitamin is added to the aqueous extract containing Intrinsic Factor before attempting to separate out or concentrate Intrinsic Factor. It is not known whether this feature is a critical element of the process of the present invention. It is known that the outlined process does give a more concentrated form and a higher yield of Intrinsic Factor than those known to the art. Although acetone is the most preferred solvent for precipitating out Intrinsic Factor and the complex of the $B_{12}$ vitamin, other water-miscible, organic solvents such as methyl ethyl ketone, ethyl alcohol, tertiary butyl alcohol, n-propyl alcohol and isopropyl alcohol can also be used. Acetone apparently gives the best yield and has other advantages: it is inexpensive, does not denature protein as readily as other solvents, is not hard to remove, and does not have an objectionable odor.

Instead of using more expensive crystalline $B_{12}$ vitamins the crude material can be used. The process of the present invention can in fact be used for the purification of the $B_{12}$ vitamins from their crude sources. The product produced would of course be in the form of a complex, probably with a protein other than Intrinsic Factor (referred to herein as "binding factor"). It is extremely stable and enhances the shelf life of the $B_{12}$ vitamins. It also increases the stability of the $B_{12}$ vitamins when used in combination with other vitamins, especially in liquid form. The present invention also makes possible small tablet and capsule dosage forms of a product possessing the activity of Intrinsic Factor and the $B_{12}$ vitamins. The use of the concentrated forms of Intrinsic Factor available prior to the present invention required oral dosages of ten to fifty grams of material daily for effective treatment. This is an inconvenient amount for a patient to take and is also difficult to formulate into capsules and tablets, especially when used in combination with other vitamins. As will be shown dosages of fifty milligrams or less of the complex of the present invention are effective in humans.

The following examples are illustrative of the process of the present invention but are not to be construed as limiting.

EXAMPLE 1

350 pounds of fresh-frozen whole hog stomach is ground in a meat grinder. The ground linings are extracted by stirring with 164 gallons of water, 29 gallons of acetone and 950 cubic centimeters of hydrochloric acid. The whole is stirred for four hours. 100 pounds of infusorial earth (Celite No. 512) is added and the whole is filtered on a press coated with fifty pounds of infusorial earth. Air is forced through the press to blow out the liquid. The cake is rinsed with thirty gallons of water. Air is again forced through the press. Liquid volume at this stage is 230 gallons.

318 milligrams of vitamin $B_{12}$ is added [this amounts to twenty gamma (plus ten percent excess) per ten grams of fresh tissue] and the extract is cooled to zero degrees centigrade. Sufficient amount of acetone pre-cooled to minus ten degrees centigrade is added to give a final concentration of 55 percent. The whole is allowed to stand overnight at five degrees centigrade. The supernatant is decanted and the precipitate is collected by centrifuging the sludge in a bowl type centrifuge (Tolhurst). Centrifuging must be done without permitting air to contact the precipitated sludge and thus preventing it from becoming a gummy plastic which is hard to work with. The precipitate is suspended in two gallons of water and freeze-dried. This process provides one therapeutic dose for each ten grams of starting material and is subsequently identified as Lot No. 1. This lot was tested on pernicious anemia patients according to the method of the Anti-Anemia Preparations Advisory Board of the U.S.P. and found to be potent as to both $B_{12}$ vitamin and Intrinsic Factor activity.

EXAMPLE 2

Following the procedure of Example 1 fresh-frozen whole hog stomach is extracted with aqueous acetone, complexed with twenty gamma of vitamin $B_{12}$ for each twenty grams of fresh tissue, and the concentrate separated out. This material is identified subsequently as Lot No. 2. This lot was tested on pernicious anemia patients according to the method of the Anti-Anemia Preparations Advisory Board of the U.S.P. and found to be potent as to both $B_{12}$ vitamin and Intrinsic Factor activity.

EXAMPLE 3

Following the procedure of Example 2, Lot No. 3 is prepared from fresh-frozen whole hog stomach. This lot was tested on pernicious anemia patients according to the method of the Anti-Anemia Preparations Advisory Board of the U.S.P. and found to be potent as to both $B_{12}$ vitamin and Intrinsic Factor activity.

EXAMPLE 4

Following the procedure of Example 1, Lot No. 4 is prepared, except that the starting material consists of desiccated, defatted whole hog-stomach powder, no acetone is used at the extraction stage and vitamin $B_{12b}$ is used. Each gram of stomach powder is considered equivalent to seven grams of whole stomach. Ten grams of starting material provided one therapeutic dose of the complex. This lot was tested on pernicious anemia patients according to the method of the Anti-Anemia Preparations Advisory Board of the U.S.P. and found to be potent as to both $B_{12}$ vitamin and Intrinsic Factor activity.

Table I gives further information on various production lots of the concentrate prepared by the process of the present invention. Several conclusions can be drawn from the data presented. The column headed "Yield of Concentrate" clearly indicates the increasingly smaller amounts of starting materials required to produce a therapeutic amount of material. This demonstrates the superiority of the process of the invention in obtaining increased yields of Intrinsic Factor from hog stomach material. The columns headed "$B_{12}$ Content" indicate the relationship of the firmly bound $B_{12}$ to the total $B_{12}$ in each gram of the concentrate. This probably explains the increased stability of $B_{12}$ in the concentrate of this invention. The last of these columns indicates the $B_{12}$ content on a gamma per U.S.P. unit basis. The last column in the table indicates the percentage recovered of the $B_{12}$ utilized in the process.

Table I

DATA ON VARIOUS LOTS OF I.F., PRODUCTION SIZE

| Lot No. | Starting Material | Amount of Starting Material | Rate of $B_{12}$ Addition | Yield of Concentrate | | | $B_{12}$ Content | | Percent $B_{12}$ Recovered |
|---|---|---|---|---|---|---|---|---|---|
| | | | | Total gm. | Mg./USP[1] Unit | Total γ/gm. | Firmly Bound,[5] γ/gm. | γ/Unit | |
| 10,427 | Stomach Po | 27 K | 33γ/10 gm.[2] | 572 | 212 (10) | 140 | 112 | 29.7 | 90 |
| 10,357-4 | ___do___ | 330 lb | 16.5γ/10 gm | 6,788 | [3] 453 (10) | 32 | 30.6 | 14.5 | 88 |
| 10,357-5 | ___do___ | 300 lb | 16.5γ/10 gm | 4,540 | [3] 333 (10) | 39.5 | 37 | 13.2 | 80 |
| 10,357-6 | ___do___ | 300 lb | 26.6γ/10 gm | 4,313 | [3] 316 (10) | 63.9 | 52.1 | 20.2 | 76 |
| 10,357-7 | Fresh Stomach | 14 lb | 16.5γ/20 gm | 39.2 | 123 (20) | 79.2 | 78.0 | 9.7 | 59 |
| 10,357-11 | ___do___ | 400 lb | 16.5γ/20 gm | 1,094 | 120.5 (20) | 106 | 99 | 12.8 | 78 |
| 10,357-12 | ___do___ | 400 lb | 16.5γ/20 gm | 1,150 | [5] 139 (20) | 108 | 103 | [4] 15 | 82 |
| 10,357-13 | ___do___ | 400 lb | 16.5γ/10 gm | 1,050 | 57.8 | 212 | 177 | 12.43 (+2.57) | 76 |
| 10,357-14 | Stomach Lining | 350 lb | 20.0γ/5 gm | 1,604 | 50.1 | 280 | 190 | 15 | 75 |

[1] An arbitrary value based on grams of starting material as indicated by number in parentheses which provided a therapeutic amount of Intrinsic Factor.
[2] Amount of starting material to which indicated quantity of $B_{12}$ was added.
[3] This increase was due to variability in starting material as demonstrated by direct comparison with earlier lot.
[4] In this instance, the dose was chosen to contain 15γ of $B_{12}$ rather than being derived from 20 gm.; 20 gm. equivalent actually contained 13.6γ $B_{12}$.
[5] Resting cell fast determined in accordance with Davis et al., Federation Proceedings, 10, 380 (1951).

The stabilizing effect of the concentrate on the components thereof affords an attractive form for liquid hematinics and vitamin supplements. Stability data for the complex in a typical liquid oral multi-vitamin preparation is shown in Table II. For convenience this preparation will be referred to as Formulation B.

Formulation B consists of:

Folic acid U.S.P.
Deionized water
Thiamine hydrochloride U.S.P.
Vitamin $B_6$ hydrochloride
Calcium pantothenate
Nicotinamide U.S.P.
Ascorbic acid U.S.P.
Riboflavin U.S.P.
Alcohol
Preservative
Flavor
Glucose

Table II

FORMULATION B STABILITY DATA

| | | Vitamin $B_{12}$ Assay | |
|---|---|---|---|
| | | Rfg., γ/cc. | 60° C., 14 days, γ/cc. |
| A | Formulation B+$B_{12}$—IF Concentrate Lot No. 1 | 3.11 3.22 | 2.95 2.92 |
| B | Formulation B+$B_{12}$—IF Concentrate Lot No. 2 | 1.55 1.82 | 1.42 1.63 |
| C | Formulation B+free $B_{12}$ | 3.29 3.26 | .07 .04 |

The data indicate that the Intrinsic Factor-$B_{12}$ concentrate exhibits a definite stabilizing effect upon $B_{12}$ since vitamin $B_{12}$ is rapidly destroyed in free form.

EXAMPLE 5

The following is an example of the reaction of binding factor in an extract containing Intrinsic Factor with the vitamin $B_{12}$ and $B_{12b}$ in a crude concentrate obtained from *Streptomyces griseus*.

*Part 1.*—300 pounds of fresh hog stomach was ground into 123 gallons of water and 20.25 gallons of acetone and the pH adjusted to 4.8 with hydrochloric acid. The material was stirred for four hours. 100 pounds of a filter aid such as infusorial earth was added and the material filtered on a press pre-coated with fifty pounds of infusorial earth. The filter cake was washed with sufficient water to give a total extract of 180 gallons.

*Part 2.*—The whole beer from a streptomycin fermentation (*Streptomyces griseus* as in Example 4 of Patent 2,595,159) was adjusted to pH 5.5 with sulfuric acid and filtered. The mycelial cake was reslurried in water, heated to boiling and filtered. After the filtrate had cooled, the pH was adjusted to 8.6 with sodium hydroxide. Diatomaceous earth and activated carbon was added and the mixtures agitated. Following filtration, the filter cake was rinsed with a dilute aqueous solution of ammonium hydroxide until the effluent reached a pH of 9.0. It was then eluted with fifty percent aqueous acetone, the pH of which had been adjusted to 9.3 with ammonium hydroxide and at a temperature of fifty degrees centigrade. The eluate was concentrated at a subatmospheric pressure and at a temperature not exceeding 55 degrees centigrade. Various amounts of vitamin $B_{12}$-$B_{12b}$ have been recovered by this procedure. As in Example 4, Patent 2,595,-159, thirty liters of *Streptomyces griseus* culture yielded 242 grams of solids containing 27.1 milligrams of vitamin $B_{12}$. The yield from 8000 liters of *Streptomyces griseus* broth has varied from two to twenty grams of vitamin $B_{12}$ with an average yield of 7.5 grams when the eluate had been reduced to thirty to fifty gallons.

*Reaction (or addition) of Part 2 with Part 1.*—6440 milliliters of Part 2 containing 408.6 milligrams of vitamin $B_{12}$ activity obtained from a *Streptomyces griseus* fermentation was added to 180 gallons of Part 1 and the mixture cooled to five degrees centigrade. 172 gallons of acetone prechilled to minus ten degrees centigrade were added while the mixture was rapidly stirred. The cold mixture was allowed to stand overnight and the next morning the clear supernatant was removed. The settled precipitate was further freed of acetone by the use of a bowl centrifuge. Finally it was freeze-dried and the aqueous acetone removed at a pressure of fifty microns of mercury. The dry powder obtained weighed 907.2 grams and assayed microbiologically to contain 359 gammas of $B_{12}$ activity per gram.

Thus a total of 325.7 milligrams of $B_{12}$ activity was recovered in the combination with a protein in the precipitate or 79.8 percent of that added.

The economic advantage of allowing the $B_{12}$ activity to react with the combining protein when the recovered product is to be used in pharmaceutical products is thus seen to be great. Further purification of the $B_{12}$ activity before combining with such a protein has resulted in large losses of the vitamin. If one first recovers the crystalline $B_{12}$ vitamins only nine percent of that present in the starting fermentation broth is obtained. In going from the concentrated eluate to "brown powder" as much as 55 percent of the activity is lost. Furthermore, the cost of carrying out the additional manipulations of further purification is obviated.

It is to be understood that the invention is not to be limited to the exact details of operation or exact compositions of matter shown and described, as obvious modifications and equivalents will be apparent to one skilled in the art, and the invention is therefore to be limited only by the scope of the appended claim.

I claim:

A storage-stabilized aqueous multivitamin composition containing vitamin $B_{12}$ activity and vitamin C wherein said vitamin $B_{12}$ activity is present in association with, as the stabilizing factor, a water soluble hog stomach extract.

References Cited by the Examiner
UNITED STATES PATENTS

| | | | |
|---|---|---|---|
| 2,582,589 | 1/52 | Fricke | 167—81 |
| 2,686,750 | 8/54 | Anderson | 167—81 |
| 2,892,754 | 6/59 | Lens | 167—74 |

OTHER REFERENCES

Wijmenga: Biochimica et Biophysica, volume 13, January 1954, pages 144 to 146.

New and Nonofficial Remedies (1954), pages 551 to 553.

Spies: Southern Medical Journal, vol. 43, March 1950, pages 206 to 208.

Ternberg: Journal of the American Chemical Society, vol. 71, November 1949, page 3858.

JULIAN S. LEVITT, *Primary Examiner.*

D. ARNOLD, M. O. WOLK, LEWIS GOTTS, *Examiners.*